3,445,480
4-(8'-CARBOXYOCTYL)-1,3-DITHIOLANES
Andre Allais, Les Lilas, and Pierre Girault, Paris, France,
assignors to Roussel-Uclaf, Paris, France, a corporation
of France
No Drawing. Filed June 27, 1967, Ser. No. 649,100
Claims priority, application France, July 6, 1966,
68,436; Oct. 4, 1966, 78,716
Int. Cl. C07d *71/00*; A61k *27/00*
U.S. Cl. 260—327               9 Claims

ABSTRACT OF THE DISCLOSURE

Novel 4 - (8'-carboxyoctyl)-1,3-dithiolanes of the formula

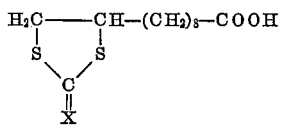

wherein X is selected from the group consisting of oxygen and sulfur and their non-toxic, pharmaceutically acceptable salts and esters which possess choleretic and hepatoprotective activity.

PRIOR APPLICATIONS

The present application is based upon French Convention applications Ser. No. 68,436 filed July 6, 1966, and Ser. No. 78,716 filed Oct. 4, 1966, the priority of which is hereby claimed.

OBJECTS OF THE INVENTION

It is an object of the invention to provide the novel 1,3-dithiolanes of Formula I and their non-toxic, pharmaceutically acceptable salts and esters.

It is another object of the invention to provide a novel process for the preparation of the 1,3-dithiolanes of Formula I.

It is a further object of the invention to provide novel choleretic compositions.

It is an additional object of the invention to provide a novel method of increasing bile secretion in warm-blooded animals.

These and other objects and advantages of the invention will become obvious from the following detailed description.

THE INVENTION

The 1,3-dithiolanes of the invention are compounds of the formula

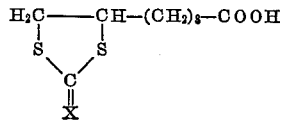

wherein X is selected from the group consisting of oxygen and sulfur and their non-toxic, pharmaceutically acceptable salts and esters.

Examples of suitable salts of the said 1,3-dithiolanes are alkali metal salts such as sodium, potassium, etc.; quaternary ammonium salts such as chloline salt or amino acids salts such as lysine salt. Examples of suitable esters of the said 1,3-dithiolanes are alkyls of 1 to 7 carbon atoms such as methyl, ethyl, propyl, butyl, etc.

The 1,3-dithiolanes of Formula I comprises reacting an alkali metal xanthate with 10,11-epoxy-undecanoic acid to form 4-(8'-carboxyoctyl)-1,3-dithiolane-2-thione which can be isolated and reacted with an oxidizing agent to form 4-(8'-carboxyoctyl-1,3-dithiolane - 2 - one. The 1,3-dithiolanes of Formula I can be reacted with an esterifying agent such as diazomethane, diazoethane, alkylhalides such as methyl or ethyl bromide, chloride or iodide to form an ester thereof or be reacted with a base such as amino acids, i.e., lysine, quaternary ammonium compound such as choline, alkali metal salts of a weak acid such as sodium or potassium carbonate or an alkali metal alcoholate such as sodium or potassium methanolate or ethanolate to form the corresponding salts.

The alkali metal xanthate is preferably formed in situ in the reaction medium by reacting carbon disulfide with an alkali metal hydroxide such as potassium or sodium hydroxide. Preferred oxidizing agents are potassium permanganate and chromic acid anhydride.

The novel choleretic compositions of the invention are comprised of a small but effective amount of at least one compound selected from the group consisting of 1,3-dithiolanes of Formula I and their non-toxic, pharmaceutically acceptable salts and esters and a major amount of a pharmaceutical carrier. The compositions may be in the form of injectable solutions or suspensions of tablets, coated tablets, cachets, capsules, emulsion, granules aromatized powders and suppositories prepared in the usual manner.

The novel products of the invention possess useful physiological activities and particularly an important choleretic and hepato-protective activity. For example, by intraduodenal administration, the said compounds manifest a significant and lasting choleretic activity at a dose of 50 mg./kg., which activity is superior to that of 1-(5',6-dihydro-2'-H-pyranyl-3')-2-phenyl-ethanol and of sodium dehydrocholate. Moreover, the hepatoprotective action is evident at the minimum active dose of 20 mg./kg., administered either orally or intraperitoneally. At this dose, the seric concentration of bromosulfonephthalein is, in fact, restored to almost normal. Moreover, the product brings about a distinct reduction of the fatty degeneration of the liver, caused by a chemical intoxication. Therefore, the products can be utilized for the treatment of dyspeptic disturbances due to insufficient bile secretion, for the treatment of functional hepato-bile disturbances, of alimentary intolerances, for the treatment of urticaria, pruritus, migraines and constipation of hepatic origin.

The novel method of the invention for increasing bile secretion in warm-blooded animals comprises administering to warm-blooded animals a safe and effective amount of at least one compound selected from the group consisting of 1,3-dithiolanes of Formula I and their non-toxic, pharmaceutically acceptable salts and esters. The said compounds may be administered orally, transcutaneously or rectally. The usual daily dose is 4 to 25 mg./kg. in the adult depending upon the method of administration.

In the following examples, there are described several preferred embodiments to illustrate the invention. However, it should be understood that the invention is not intended to be limited to the specific embodiments.

EXAMPLE I

Preparation of 4-(8'-carboxyoctyl)-1,3-dithiolane-2-thione 56 gm. of potassium hydroxide in the form of pellets were dissolved in 240 cc. of methanol under agitation, and after the resulting solution was cooled to +5° C., 91.2 gm. of carbon sulfide were added thereto. The agitation was continued, first for 30 minutes at 5° C. and then for 30 minutes at 20° C. Next, a solution of 80 gm. of 10,11-epoxy undecanoic acid in 300 cc. of methanol and a solution of 22.4 gm. of potassium hydroxide in pellet form in 100 cc. of methanol were added thereto. The agitation was then continued for 3 hours at 20° C., after which the reaction mixture was allowed to stand overnight. Then 1,600 cc. of water were added, and the reaction mixture was heated at 50° C. for one hour, then cooled at 15° C., and 200 cc. of 5 N hydrochloric acid were added to precipitate 4-(8'-carboxyoctyl)-1,3-dithiolane-2-thione. The precipitate was filtered and washed first with water, then with petroleum ether and finally dried in vacuo to obtain 90 gm. of the raw compound, which was purified by recrystallization from n-butanol to obtain pure 4-(8'-carboxyoctyl)-1,3-dithiolane-2-thione, (yield=36%) having a melting points of 71–72° C. The product was soluble in alcohol, acetone, benzene and chloroform, and insoluble in water and propyleneglycol.

*Analysis.*—$C_{12}H_{20}S_3O_2$: molecular weight=292.49. Calculated: C, 49.27%; H, 6.89%; S, 32.89%. Found: C, 49.1%; H, 7.0%; S, 32.8%.

This compound is not described in the literature.

The starting epoxy compound was obtained according to the method described by P. L. Harris et al., J. Chem. Soc. 1935, 1 572.

EXAMPLE II

Preparation of the sodium salt of 4-(8'-carboxyoctyl)-1,3-dithiolane-2-thione

A solution of 50 gm. of 4-(8'-carboxyoctyl)-1,3-dithiolane-2-thione in 300 cc. of ethanol was admixed under agitation and while cooling in a water-ice bath with a solution of 12 gm. of sodium in 250 cc. of ethanol. The reaction mixture was then allowed to stand for one hour at a temperature of +5° C. The product was filtered, triturated in ethanol and dried in vacuo to obtain 50 gm., (yield=94%) of the sodium salt of 4-(8'-carboxyoctyl)-1,3-dithiolane-2-thione in the form of a solid product having a melting point of about 280° C., soluble in water, insoluble in ether, acetone, benzene and chloroform and slightly soluble in ethanol.

*Analysis.*—$C_{12}H_{19}O_2S_3Na$: molecular weight=314.45. Calculated: C, 45.82%; H, 6.09%; Na, 7.31%. Found: C, 45.5%; H, 6.25%; Na, 7.64%.

This compound is not described in the literature.

EXAMPLE III

Preparation of 4-(8'-carboxyoctyl)-1,3-dithiolane-2-one 13 gm. of 4-(8'-carboxyoctyl)-1,3-dithiolane-2-thione were dissolved in 390 cc. of acetone and then 22 gm. of potassium permanganate were added in small fractions. The mixture was filtered and the precipitate formed was washed with acetone and taken up in 250 cc. of water. The pH-value was adjusted to about 2 with 10 cc. of sulfuric acid and the mixture was extracted with ether. The combined ethereal phases were washed with water, dried over sodium sulfate, filtered and evaporated to dryness to obtain 8.5 gm. of raw product which was purified first by dissolution in methanol at reflux, then by addition of water and ice. Thus 7.2 gm. of 4-(8'-carboxyoctyl)-1,3-dithiolane-2-one having a melting point of 66°–68° C. were obtained. The product was soluble in alcohol, ether, benzene, acetone and chloroform and insoluble in water.

*Analysis.*—$C_{12}H_{20}O_3S_2$: molecular weight=276.42. Calculated: C, 52.14%; H, 7.29%; S, 23.20%. Found: C, 52.2%; H, 7.4%; S, 22.8%.

This compound is not described in the literature.

EXAMPLE IV

Preparation of 4-(8'-carbomethoxyoctyl)-1,3-dithiolane-2-thione 10 gm. of 4-(8'-carboxyoctyl)-1,3-dithiolane-2-thione were dissolved in 50 cc. of methylene chloride and then 170 cc. of a 1% diazomethane solution were added at a temperature of about +5° C. The reaction mixture was restored to room temperature and was then allowed to stand overnight. Then the methylene chloride solution was washed first with an aqueous solution of 4% sodium bicarbonate, then with water and dried over sodium sulfate. The methylene chloride was evaporated under vacuum and heated for one hour under a 2 mm. vacuum to obtain 6 gm. of 4-(8'-carbomethoxyoctyl)-1,3-dithiolane-2-thione in the form of a liquid yellow-amber colored product, which was miscible with most of the usual organic solvents and immiscible with water.

*Analysis.*—$C_{13}H_{22}O_2S_3$: molecular weight=306.52. Calculated: C, 50.93%; H, 7.23%; S, 31.38%. Found: C, 51.0%; H, 7.0%; S, 30.8%.

This compound is not described in the literature.

EXAMPLE V

Preparation of the lysine salt of 4-(8'-carboxyoctyl)-1,3-dithiolane-2-thione 1 gm. of 4-(8'-carboxyoctyl)-1,3-dithiolane-2-thione was added to a solution of 0.5 gm. of L-lysine in 7 cc. of water. The mixture was agitated for 15 minutes, then filtered and evaporated to dryness under vacuum to obtain 1.42 gm. of the lysine salt of 4-(8'-carboxyoctyl)-1,3-dithiolane-2-thione in the form of a yellow amorphous product which was soluble in water.

This compound is not described in the literature.

In an analogous manner, the choline salt of 4-(8'-carboxyoctyl)-1,3-dithiolane-2-thione was prepared.

This compound is not described in the literature.

PHARMACOLOGICAL STUDY

A. CHOLERETIC ACTIVITY ON GUINEA PIGS

The choleretic activity was ascertained by catherization of the choledoc canal of guinea pigs which had been anesthetized with urethane. 4-(8'-carboxyoctyl)-1,3-dithiolane-2-thione and 4-(8'-carboxyoctyl)-1,3-dithiolane-2-one were administered by intraduodenal injection as an aqueous suspension at doses of 50 and 100 mg./kg. Another test was conducted with 4-(8'-carboxyoctyl)-1,3-dithiolane-2-thione administered intravenously as a solution in acetylmethylamine, at a dose of 50 mg./kg.

The amount of bile discharge was measured every hour over a period of 4 to 5 hours after the treatment with the same measures being employed on the control animals. The tests were conducted in comparison with 1-(5,6-dihydro-2H-pyranyl-3)-2-phenyl-ethanol administered by intraduodenal injection at a dose of 100 g./kg. and also in comparison with sodium dehydrocholate administered intravenously at doses of 50 and 100 mg./kg. The results of these tests are summarized in Tables Ia and Ib.

TABLE Ia.—INTRADUODENAL ADMINISTRATION

| Groups | Doses in mg./kg. | Bile discharge in cc. | | | | |
|---|---|---|---|---|---|---|
| | | 1st hr. | 2nd hr. | 3rd hr. | 4th hr. | 5th hr. |
| Controls | 0 | 3.1 | 5.3 | 7.1 | 8.7 | 10.2 |
| 4-(8'-carboxyoctyl)-1,3-dithiolane-2-thione | 50 | 3.6 (+16%) | 6.3 (+19%) | 8.5 (+20%) | 10.3 (+20%) | 12.3 (+20%) |
| Controls | 0 | 3.4 | 5.6 | 7.7 | 9.6 | 11.5 |
| 4-(8'-carboxyoctyl)-1,3-dithiolane-2-thione | 100 | 5.2 (+53%) | 8.5 (+52%) | 11.4 (+48%) | 13.5 (+41%) | 15.3 (+33%) |
| Controls | 0 | 4.4 | 7.65 | 10.75 | 13.55 | 15.9 |
| 4-(8'-carboxyoctyl)-1,3-dithiolane-2-one | 50 | 5.5 (+25%) | 9.55 (+25%) | 12.7 (+18%) | 15.45 (+14%) | 17.9 (+13%) |
| | 100 | 6.2 (+41%) | 10.7 (+40%) | 14.3 (+33%) | 17.2 (+27%) | 19.8 (+25%) |
| Controls | 0 | 4.2 | 7.2 | 10.2 | 13.1 | 15.6 |
| 1-(5,6-dihydro-2H-pyranyl-3)-2-phenyl ethanol | 100 | 6.4 (+52%) | 11.0 (+52%) | 14.9 (+46%) | 18.5 (+41%) | 21.3 (+36%) |

TABLE Ib.—INTRAVENOUS ADMINISTRATION

| Groups | Doses in mg./kg. | Bile discharge in cc. | | | | |
|---|---|---|---|---|---|---|
| | | 1st hr. | 2nd hr. | 3rd hr. | 4th hr. | 5th hr. |
| Controls | 0 | 2.5 | 4.9 | 6.9 | 8.8 | |
| 4-(8'-carboxyoctyl)-1,3-dithiolane-2-thione | 50 | 3.55 (+42%) | 5.3 (+8%) | 7.1 | 8.8 | |
| Controls | 0 | 3.2 | 6.3 | 9.1 | 11.5 | 14.0 |
| Sodium dehydrocholate | 50 | 5.1 (+60%) | 8.3 (+31%) | 10.8 (+19%) | 13.3 (+16%) | 15.2 (+8%) |

Table Ia shows that by intraduodenal administration, the products of the invention showed a significant and lasting choleretic activity already at the dose of 50 mg./kg., and that their activity was equal to that of the 1-(5,6-dihydro-2H-pyranyl-3)-2-phenyl-ethanol at a dose of 100 mg./kg. Table Ib shows that by means of intravenous administration, 4-(8'-carboxyoctyl) - 1,3 - dithiolane-2-thione increased the bile flow by 42% per hour at a dose of 50 mg./kg. while the effect of sodium dehydrocholate at the same dose was hardly more pronounced. Moreover, it was determined that sodium dehydrocholate was inactive when given intraduodenally under the same test conditions at a dose of 100 mg./kg.

B. CHOLERETIC ACTIVITY ON DOGS

The choleretic activity was also determined on dogs by catheterization of the choledoc canal of dogs which had been anesthetized with Somnifene, (a solution of Veronal and Numal). The tests were conducted on dogs with a cystic canal, tied and untied. The animals were kept under artificial respiration during certain experiments. The amount of bile discharge was determined prior to any treatment, after the injection of solvent, (acetylmethylamine administered at the same volumes as those utilized for the administration as a solution of the products), and then after intravenous administration of 4-(8'-carboxyoctyl)-1,3,dithiolane-2-thione at doses of 5, 10 or 20 mg./kg. or of 4-(8'-carboxyoctyl)-1,3-dithiolane-2-one at doses of 10 or 20 mg./kg. and eventually after the administration of sodium cholate or of sodium dehydrocholate as a means of comparison. In most of the tests, the biliary residue was also determined. The results obtained are summarized in Tables II, III, IV and V.

TABLE II.—DOG WITH CYSTIC CANAL NOT TIED

| | Doses in mg./kg. | Bile discharge in cc./hour |
|---|---|---|
| Before treatment | 0 | 1.1 for 120 minutes. |
| After treatment with 4- (8'-carboxyoctyl)- 1,3-dithiolane-2-thione. | 10; 20 | 1.5 for 60 minutes; 4.0 for 45 minutes. |

TABLE III.—DOG WITH CYSTIC CANAL NOT TIED

| | Doses | Bile discharge, cc./hr. | Bile residue at 100° C. | |
|---|---|---|---|---|
| | | | Percent | Mg./hr. |
| Before treatment | 0 | 1.65 for 75 minutes | 6.02 | 98 |
| After treatment with acetylmethylamine alone | 0.2 cm.³/kg | 1.60 for 15 minutes | | |
| After treatment with 4-(8'-carboxyoctyl)-1,3-dithiolane-2-thione | 10 mg./kg | 4.0 for 30 minutes; 3.6 for 45 minutes; 2.4 for 45 minutes; 1.6 for 45 minutes. | 5.05 | 141 |
| Before treatment | 0 | 1.5 for 60 minutes | 5.09 | 76 |
| After treatment with acetylmethylamine alone | 0.4 cm.³/kg | 1.3 for 30 minutes | 5.97 | 77 |
| After treatment with 4-(8'-carboxyoctyl)-1,3-dithiolane-2-thione | 20 mg./kg | 4.8 for 30 minutes; 3.2 for 15 minutes; 2.0 for 75 minutes; 1.4 for 30 minutes. | 5.22 | 134 |
| Before treatment | 0 | 1.8 for 45 minutes | 4.02 | 72 |
| After treatment with sodium cholate | 20 mg./kg | 9.2 for 15 minutes; 6.8 for 15 minutes. | 5.27 | 421 |

TABLE IV.—DOG WITH CYSTIC CANAL TIED

| | Doses | Bile discharge cc./hr. | Bile residue at 100° C. | |
|---|---|---|---|---|
| | | | Percent | Mg./hr. |
| Before treatment | 0 | 6.8 for 90 minutes | 6.97 | 473 |
| After treatment with acetylmethylamine | 0.1 cm.³/kg | 8.0 for 60 minutes | 7.78 | 622 |
| After treatment with 4-(8'-carboxyoctyl)-1,3-dithiolane-2-thione | 5 mg./kg | 7.5 for 60 minutes | 7.05 | 529 |
| After treatment with sodium dehydrocholate | 5 mg./kg | 12.0 for 45 minutes; 7.7 for 45 minutes. | 5.89 | 516 |
| After treatment with acetylmethylamine | 0.2 cm.³/kg | 6.8 for 30 minutes | 6.28 | 427 |
| After treatment with 4-(8'-carboxyoctyl)-1,3-dithiolane-2-thione | 10 mg./kg | 10.0 for 15 minutes; 7.5 for 45 minutes. | 5.73 | 465 |
| After treatment with sodium dehydrocholate | 10 mg./kg | 13.6 for 15 minutes; 11.6 for 15 minutes; 8.8 for 30 minutes. | 4.58 | 490 |

TABLE V.—DOGS WITH TIED CYSTIC CANAL AND KEPT UNDER ARTIFICIAL RESPIRATION

|  | Doses | Bile discharge cc./hr. | Bile residue at 100° C., percent |
|---|---|---|---|
| Before treatment | 0 | 2.1 for 60 minutes | 5.95 |
| After treatment with acetylmethylamine | 0.2 cm.³/kg | 1.6 for 30 minutes | 3.30 |
| After treatment with 4-(8'-carboxyoctyl)-1,3-dithiolane-2-thione | 10 mg./kg | 2.4 for 30 minutes, 2.0 for 15 minutes; 1.6 for 60 minutes. | 3.36 |
| Before treatment | 0 | 2.1 for 60 minutes | 5.95 |
| After treatment with acetylmethylamine | 0.4 cm.³/kg | 1.3 for 45 minutes | 2.36 |
| After treatment with 4-(8'-carboxyoctyl)-1,3-dithiolane-2-thione | 20 mg./kg | 2.4 for 15 minutes; 2.0 for 15 minutes; 1.6 for 15 minutes; 1.2 for 30 minutes. | 3.51 |
| Before treatment | 0 | 1.6 for 120 minutes | 3.88 |
| After treatment with acetylmethylamine | 0.1 cm.³/kg | 1.6 for 15 minutes | 3.84 |
| After treatment with 4-(8'-carboxyoctyl)-1,3-dithiolane-2-one | 10 mg./kg | 2.2 for 15 minutes; 3.4 for 15 minutes; 2.0 for 15 minutes; 1.7 for 45 minutes. | 4.66 |
| Before treatment | 0 | 1.6 for 120 minutes | 3.88 |
| After treatment with acetylmethylamine | 0.2 cm.³/kg | 1.6 for 60 minutes | 3.76 |
| After treatment with 4-(8'-carboxyoctyl)-1,3-dithiolane-2-one | 20 mg./kg | 2.0 for 15 minutes; 4.2 for 30 minutes; 2.0 for 15 minutes; 1.2 for 60 minutes. | 4.24 |

The said tables show that the two products of the invention exerted an action on the bile discharge at the dose of 10 mg./kg. on the dogs. Moreover, examination of the bile residue, the horary amount of which increased in most of the tests, revealed that it was not a question of a simple hydrocholeresis.

C. HEPATO-PROTECTIVE ACTIVITY

The hepato-protective activity of 4-(8'-carboxyoctyl)-1,3-dithiolane-2-thione was evaluated on rats by employing various following techniques all of which involved intoxication of the animals with carbon tetrachloride, the hepatic toxicity being evidenced by a necrosis of the liver accompanied by fatty degeneration and functional disturbances.

D. TEST WITH BROMOSULFONEPHTHALEIN

The hepatic attack produced by carbon tetrachloride revealed itself in particular in this test by a retention of bromosulfonephthalein in the blood. This experiment, which determined the amount of stain in the serum 20 minutes after its intravenous injection, was carried out in the following groups of rats weighing 250 gm. each; intact control animals; control animals intoxicated by intraperitoneal injection of carbon tetrachloride (diluted in olive oil), 24 hours prior to the injection of bromosulfonephthalein; rats intoxicated under the same conditions and treated with the test products 48 hours, 36 hours, 24 hours and 4 hours prior to the injection of bromosulfonephthalein. In these tests, the treatment was, consequently, chiefly preventive. Furthermore, the fatty degeneration of the liver was subjectively evaluated as + (scale of 0 to 3+).

4-(8'-carboxyoctyl)-1,3-dithiolane-2-thione was administered intraperitoneally as an aqeous suspension at doses of 5, 10, 20 and 50 mg./kg. and orally administered at doses of 10 and 20 mg./kg. 4-(8'-carboxyoctyl)-1,3-dithiolane-2-one was tested under the same conditions at doses of 10 and 20 mg./kg. given intraperitoneally and at doses of 20 and 50 mg./kg. given orally. The following tables summarize the results obtained from these tests.

TABLE VI.—4-(8'-CARBOXYOCTYL)-1,3-DITHIOLANE-2-THIONE GIVEN INTRAPERITONEALLY

| Groups of rats | Doses | Seric amounts of bromosulfonephthalein in mg./100 ml. of serum | Fatty degeneration of liver in + |
|---|---|---|---|
| Intact controls | 0 | 0.30 |  |
| Controls intoxicated with carbon tetrachloride |  | 2.03 | 2.2 |
| 4-(8'-carboxyoctyl)-1,3-dithiolane-2-thione | 50 mg./kg | 0.34 (−83%) | 1.6 |
| Controls intoxicated with carbon tetrachloride |  | 2.74 | 2.5 |
| 4-(8'-carboxyoctyl)-1,3-dithiolane-2-thione | 20 mg./kg | 0.49 (−82%) | 1.4 |
| Controls intoxicated with carbon tetrachloride |  | 5.12 | 1.9 |
| 4-(8'-carboxyoctyl)-1,3-dithiolane-2-thione | 10 mg/.kg | 2.86 (−44%) | 2.0 |
| Controls intoxicated with carbon tetrachloride |  | 1.93 | 1.9 |
| 4-(8'-carboxyoctyl)-1,3-dithiolane-2-thione | 5 mg./kg | 1.77 (−8%) | 1.6 |

NOTE.—The numbers in parentheses indicate the reduction in percent in comparison with intoxicated control animals.

TABLE VII.—4-(8'-CARBOXYOCTYL)-1,3-DITHIOLANE-2-ONE GIVEN INTRAPERITONEALLY

| Groups of rats | Doses | Seric amounts of bromosulfonephthalein in mg./100 ml. of serum | Fatty degeneration of liver in + |
|---|---|---|---|
| Controls intoxicated with carbon tetrachloride |  | 4.89 | 1.8 |
| 4-(8'-carboxyoctyl)-1,3-dithiolane-2-one | 20 mg./kg | 1.24 (−75%) | 0.5 |
| Controls intoxicated with carbon tetrachloride |  | 3.97 | 1.2 |
| 4-(8'carboxyoctyl)-1,3-dithiolane-2-one | 10 mg./kg | 2.13 (−47%) | 1.8 |

TABLE VIII.—4-(8'-CARBOXYOCTYL)-1,3-DITHIOLANE-2-THIONE GIVEN ORALLY

| Groups of rats | Doses | Seric amounts of bromosulfonephthalein in mg./100 ml. of serum | Fatty degeneration of liver in + |
|---|---|---|---|
| Controls | 0 | 0.30 |  |
| Controls intoxicated with carbon tetrachloride |  | 2.74 | 2.5 |
| 4-(8'-carboxyoctyl)-1,3-dithiolane-2-thione | 20 mg./kg | 0.47 (−83%) | 1.4 |
| Controls intoxicated with carbon tetrachloride |  | 5.12 | 1.9 |
| 4-(8'-carboxyoctyl)-1,3-dithiolane-2-thione | 10 mg./kg | 4.38 (−14%) | 1.9 |

TABLE IX.—4-(8'-CARBOXYOCTYL)1,3-DITHIOLANE 2-ONE GIVEN ORALLY

| Groups | Doses | Seric amounts of bromo-sulfone-phthalein in mg./100 ml. of serum | Fatty degeneration of liver in ++ |
|---|---|---|---|
| Controls intoxicated with carbon tetrachloride | | 4.89 | 1.8 |
| 4-(8'-carboxyoctyl)-1,3-dithiolane-2-one | 20 mg./kg | 3.95 (−20%) | 1.4 |
| Controls intoxicated with carbon tetrachloride | | 3.97 | 1.2 |
| 4-(8'-carboxyoctyl)-1,3-dithiolane-2-one | 50 mg./kg | 1.34 (−66%) | 1.8 |

The above table shows that the minimum active dose of 4-(8'-carboxyloctyl)-1,3-dithiolane-2-thione under the test conditions was 20 mg./kg., administered orally or intraperitoneally. At this dose, the seric concentration of the bromo-sulfonephthalein was, in fact, restored almost to normal. Moreover, the product induced a distinct reduction of the fatty degeneration of the liver. The chromagogue activity of 4-(8'-carboxyoctyl)-1,3-dithiolane-2-one was marked at doses of 20 mg./kg. given intraperitoneally and at doses of 50 mg./kg. given orally.

(2) Protection against fatty degeneration caused by carbon tetrachloride in the rat This test was conducted on female rats weighing 200 gm. each.

The animals received, as preventive measure, 4-(8'-carboxyoctyl)-1,3-dithiolane-2-thione as an aqueous suspension orally at doses of 50 and 100 mg./kg. and intraperitoneally a dose of 100 mg./kg. administered 48 hours, 24 hours and 1 hour before the oral administration of the carbon tetrachloride as a solution in olive oil. The hepatic lipids and triglycerides were determined 24 hours after the intoxication with carbon tetrachloride and the weight of the liver was determined. In addition, the test with bromosulfonephthalein was carried out prior to the sacrifice of the animals under the same conditions as previously described in (1). The same experiment was effected on groups of intact rats as well as of rats intoxicated with carbon tetrachloride. The obtained results are summarized in the following table.

and a second group received by oral administration daily 2 cc./kg. of a 20% solution of carbon tetrachloride in olive oil for 17 days, and a third group received in addition to carbon tetrachloride 4-(8'-carboxyoctyl)-1,3-dithiolane-2-thione, orally administered, at a dose of 50 mg./kg. The animals were sacrificed on the 18th day, and the amount of the seric glutame-oxaloacetic-transminase (S.G.O.T.) and of the hepatic lipids was determined. The liver, seminal vesicles, prostate gland and kidneys were weighed. The results are summarized in the following table.

TABLE XI

| Groups | Increase in weight, percent | S.G.O.T. μ mol/cm.³/hr. | Liver in g., percent g. | Hepatic lipids, mg. percent g. | | Seminal vesicles, mg. | Prostate gland, mg. | Kidneys mg. percent g. |
|---|---|---|---|---|---|---|---|---|
| | | | | percent | Body weight | | | |
| Controls | 36 | 11 | 4.37 | 4.4 | 191 | 390 | 208 | 764 |
| Carbon tetrachloride alone | 12 | 283 | 6.11 (+40%) | 7.2 | 437 | 156 (−66%) | 122 (−42%) | 852 |
| 4-(8'-carboxyoctyl)-1,3-dithiolane-2-thione 50 mg./kg. plus carbon tetrachloride given orally | 28 | 43 (−85%) | 5.40 (+23%) | 6.7 (−7%) | 371 (−15%) | 292 (−25%) | 192 (−8%) | 836 |

Table XI shows that a distinct protective action was observed with reference to the cytolysis caused by carbon tetrachloride as shown by the significant decrease of the amount of S.G.O.T. Besides, a marked protection against checking the growth and the atrophy of the secondary sexual organs involved caused by carbon tetrachloride could be observed.

E. DETERMINATION OF ACUTE TOXICITY IN MICE (1) Intraperitoneal administration 4-(8'-carboxyoctyl)-1,3-dithiolane - 2 - thione was administered intraperitoneally as an aqueous suspension at increasing doses of 250, 500, 750 mg./kg. and 1 g./kg. to groups of mice of the Rockland strain weighing between 18 and 22 gm. each. The animals were kept under observation for one week. The 50% lethal dose ($LD_{50}$) was about 500 mg./kg. The $LD_{50}$ of 4-(8'-carboxyoctyl)-1,3-dithiolane-2-one administered under the same experimental conditions was greater than 500 mg./kg.

TABLE X

| Groups | Liver in g., percent g. | Hepatic lipids in g. for 100 g. | Hepatic triglycerides in mg. per g. | Bromosulfonephthalein in mg. for 100 cm.³ of serum |
|---|---|---|---|---|
| Controls | 4.37 | 4.5 | | 0.21 |
| Controls intoxicated with carbon tetrachloride | 4.50 | 13.4 | | 9.81 |
| 4-(8'-carboxyoctyl)-1,3-dithiolane-2-thione 50 mg./kg. (orally) plus carbon tetrachloride | 4.67 | 11.6 (−14%) | | 2.25 (−77%) |
| Controls | 4.42 | 4.7 | 7.0 | 0.22 |
| Controls intoxicated with carbon tetrachloride | 4.59 | 13.8 | 111.7 | 11.16 |
| 4-(8'-carboxyoctyl)-1,3-dithiolane-2-thione 100 mg./kg. (orally) plus carbon tetrachloride | 5.14 | 12.0 (−13%) | 80.0 (−28%) | 3.26 (−71%) |
| 4-(8'-carboxyoctyl)-1,3-dithiolane-2-thione 100 mg./kg. (intraperitoneally) plus carbon tetrachloride | 4.66 | 8.8 (−36%) | 51.6 (−54%) | 2.43 (−78%) |

Table X shows that the amount of hepatic lipids and triglycerides in the control animals intoxicated with carbon tetrachloride was considerably higher in comparison to that in the control animals not intoxicated.

4-(8'-carboxyoctyl)-1,3-dithiolane 2-thione ensures an important protection. The favourable effect, already ascertained upon the retention of bromosulfonephthaleine, is shown again.

(3) Action by the chronic intoxication in the rat with carbon tetrachloride

Groups of male rats weighing 200 gm. each were utilized for this test with one group serving as control

*Symptomatology.*—A phase of excitation with excessive contractions leading to death in extension position.

(2) Oral administration 4-(8'-carboxyoctyl)-1,3-dithiolane-2-thione was void of any toxic effect at a dose of 2 g./kg. The $LD_{50}$ of 4-(8'-carboxyoctyl)-1,3-dithiolane-2-one was definitely higher than 2 g./kg. (At this dose, one death out of ten was observed.)

Various modifications of the products and method of the invention may be made without departing from the spirit or scope thereof and it is to be understood that the

We claim:
1. A compound selected from the group consisting of 4-(8'-carboxyoctyl)-1,3-dithiolanes of the formula

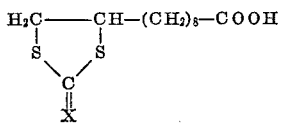

wherein X is selected from the group consisting of oxygen and sulfur and their alkali metal and nitrogenous base salts and alkyl esters of 1 to 7 carbon atoms.

2. A compound of claim 1 wherein the salt is selected from the group consisting of alkali metal salts and nitrogenous base salts.

3. A compound of claim 1 wherein the ester is an alkyl ester of 1 to 7 carbon atoms.

4. A compound of claim 1 which is 4-(8'-carboxyoctyl)-1,3-dithiolane-2-one.

5. A compound of claim 1 which is 4-(8'-carboxyoctyl)-1,3-dithiolane-2-thione.

6. A compound of claim 1 which is the sodium salt of 4-(8'-carboxyoctyl)-1,3-dithiolane-2-thione.

7. A compound of claim 1 which is the L-lysine salt of 4-(8'-carboxyoctyl)-1,3-dithiolane-2-thione.

8. A compound of claim 1 which is the choline salt of 4-(8'-carboxyoctyl)-1,3-dithiolane-2-thione.

9. A compound of claim 1 which is 4-(8'-carbomethoxyoctyl)-1,3-dithiolane-2-thione.

References Cited

UNITED STATES PATENTS

| 2,647,129 | 7/1953 | Bashour | 260—327 |
| 2,752,249 | 6/1956 | Latham et al. | 260—327 |
| 3,049,549 | 8/1962 | Reed et al. | 260—327 |

OTHER REFERENCES

Shasha et al., Nature, vol. 210 (1966), pp. 89–90.

JAMES A. PATTEN, *Primary Examiner.*

U.S. Cl. X.R.

424—277